(12) United States Patent
Ludwig et al.

(10) Patent No.: US 8,764,523 B2
(45) Date of Patent: Jul. 1, 2014

(54) MACERATOR HAVING AUTOMATED ROLLER SPACING CONTROL

(75) Inventors: Ralf Ludwig, Accord, NY (US); Richard Timperio, Highland, NY (US)

(73) Assignee: Wolf-Tec, Inc., Kingston, NY (US)

( * ) Notice: Subject to any disclaimer, the term of this patent is extended or adjusted under 35 U.S.C. 154(b) by 770 days.

(21) Appl. No.: 12/900,962

(22) Filed: Oct. 8, 2010

(65) Prior Publication Data
US 2011/0084155 A1 Apr. 14, 2011

Related U.S. Application Data

(60) Provisional application No. 61/249,832, filed on Oct. 8, 2009.

(51) Int. Cl.
*A22C 9/00* (2006.01)

(52) U.S. Cl.
USPC ............................................. 452/142; 241/25

(58) Field of Classification Search
USPC ............... 452/141, 142, 144; 241/25, 101.01, 241/198.1, 200, 220–223
See application file for complete search history.

(56) References Cited

U.S. PATENT DOCUMENTS

| | | | |
|---|---|---|---|
| 3,644,125 A | 2/1972 | Lobiondo et al. | |
| 3,893,384 A | 7/1975 | Lo Biondo et al. | |
| 4,254,533 A | 3/1981 | Lo Biondo et al. | |
| 4,270,244 A | 6/1981 | Lo Biondo et al. | |
| 4,343,067 A | 8/1982 | Shelton | |
| 4,385,420 A | 5/1983 | Shelton | |
| 4,453,288 A | 6/1984 | Lo Biondo et al. | |
| 4,531,259 A | 7/1985 | Bridge, Jr. | |
| 4,660,253 A | 4/1987 | Lo Biondo et al. | |
| 4,672,716 A | 6/1987 | Dickey | |
| 4,776,064 A | 10/1988 | LoBiondo et al. | |
| 4,791,705 A | 12/1988 | Corominas | |
| 4,942,047 A | 7/1990 | Buckholz, Jr. et al. | |
| 4,958,410 A | 9/1990 | Lagares | |
| 5,004,618 A | 4/1991 | Buckholz, Jr. et al. | |
| 5,145,453 A * | 9/1992 | Anderson et al. | 452/142 |
| 5,505,388 A * | 4/1996 | Chambers et al. | 241/46.02 |
| 5,783,474 A * | 7/1998 | Ajit | 438/279 |
| 5,957,767 A | 9/1999 | Horton | |
| 5,972,398 A | 10/1999 | Ludwig et al. | |
| 6,058,689 A * | 5/2000 | Kraus et al. | 56/16.4 B |
| 6,176,090 B1 * | 1/2001 | Ufema | 62/68 |
| 6,257,132 B1 | 7/2001 | Bifulco | |
| RE37,349 E * | 9/2001 | Chambers et al. | 241/46.02 |

(Continued)

*Primary Examiner* — Richard Price, Jr.
(74) *Attorney, Agent, or Firm* — Boyle Fredrickson, S.C.

(57) ABSTRACT

The present invention is a processing device, such as a macerator for use in processing various types of food products, that includes an automatic adjustment mechanism for adjusting the position of a roller disposed within the macerator. The mechanism includes a controller operably connected to a motor that can move the roller within the macerator to vary the position of the roller with respect to another roller located in the macerator. Inputs to the controller are used to control the operation of the motor to move the roll into a desired configuration associated in a storage medium in the controller with a particular food product to be processed. The input to the controller can also be used to simultaneously adjust the position of other components of other processing devices in a food processing system, such as an injector to remove the need for individually adjust each device in the system. Also, the controller can utilize other devices on the macerator to dynamically adjust the position of the rollers in response to the individual food products being treated in the macerator.

12 Claims, 15 Drawing Sheets

(56) References Cited

U.S. PATENT DOCUMENTS

| | | |
|---|---|---|
| 6,601,499 B1 | 8/2003 | Bifulco |
| 7,024,988 B2 | 4/2006 | Corominas |
| 7,077,057 B1 | 7/2006 | Corominas |
| 7,410,414 B2 | 8/2008 | Corominas |
| 2005/0042361 A1 | 2/2005 | Tomey et al. |
| 2005/0124276 A1 | 6/2005 | Gagliardi, Jr. |
| 2005/0221746 A1 | 10/2005 | Bell et al. |
| 2005/0249863 A1 | 11/2005 | Morin et al. |
| 2005/0255224 A1 | 11/2005 | Morin et al. |
| 2005/0276903 A1 | 12/2005 | Morin et al. |
| 2006/0003681 A1 | 1/2006 | Kindermann |
| 2006/0085113 A1 | 4/2006 | Tamaizumi et al. |

\* cited by examiner

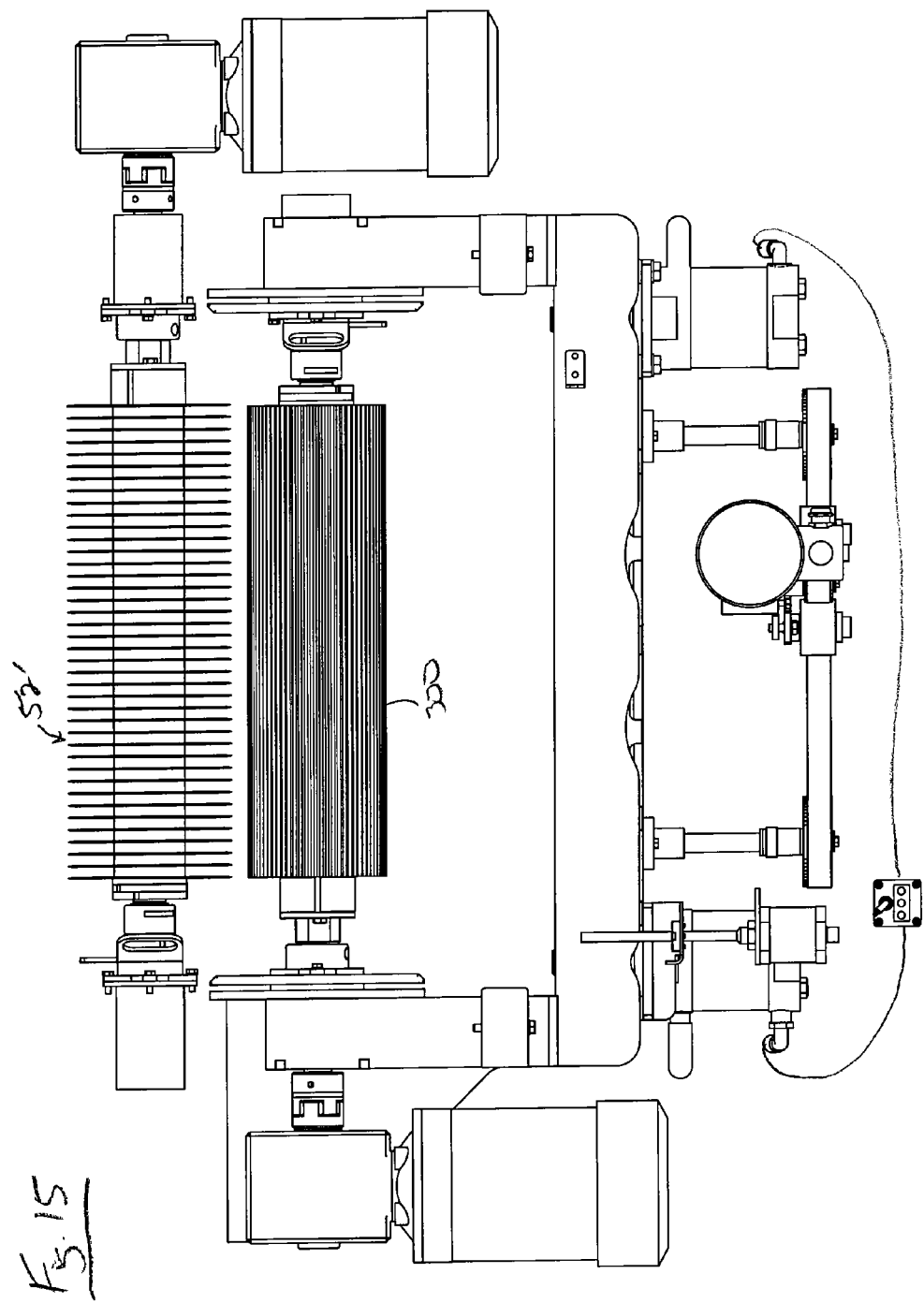

MACERATOR HAVING AUTOMATED ROLLER SPACING CONTROL

CROSS-REFERENCE TO RELATED APPLICATIONS

This application claims priority from U.S. Provisional Application Ser. No. 61/249,832, filed on Oct. 8, 2009, the entirety of which is hereby expressly incorporated by reference herein.

FIELD OF THE INVENTION

The present invention relates to machines utilized in preparing food products, and more specifically to tenderize the food products by passing the food products through sets of rotary knives.

BACKGROUND OF THE INVENTION

In the preparation of food products, depending on the type of food product being prepared, different operative conditions are employed in the various devices that are utilized in the preparation of the food product. These devices or machines can include injectors for introducing various marinades and other additives into the food products and macerators for tenderizing the food products, among others.

However, because these machines are often utilized to process and prepare different types of food products having different parameters, such as meat products including beef, pork, poultry, muscle groups, and other meat types, among others, the differences in these types of food products require different preparation steps in order to properly prepare the food product as desired. For example, the spacing for the rotary blade shafts in a macerator must be adjusted to accommodate the size of the various types of food products so that the particular food products are properly macerated/cut/surface treated for further processing.

In prior art food product processing systems, the control of the operation of the individual devices or machines utilized in the system is accomplished by manually adjusting the operational parameters of the individual machines to the desired condition. Thus, when there is a change in the type of food product being processed or in the desired final preparation for the food products, the individual machines must be manually reconfigured to the desired settings to produce the food products in the desired state.

However, to make these adjustments, the prior art devices require that an individual turn a handwheel or other manually operable instrument to adjust the settings for the device. Because this is required for each device in the food processing system, oftentimes an individual would fail to accurately make the adjustment on each of the devices in the system, or simply would place the devices at a compromise setting that could enable the devices to process multiple types of food products, but without the devices being optimized for any one product type.

In order to reduce the amount of adjustment required for the machines to accommodate these types of changes, various mechanisms have been developed for use on the various machines in a food processing system to reduce the manual adjustment necessary for these machines. For example, U.S. Publ. No. 2005/0124276 of Gagliardi, Jr. discloses a meat tenderizing and flattening apparatus. The apparatus includes a pair of parallel rollers spaced apart by a predetermined distance. The predetermined distance is preferably in the range of about 1/16th inch to about 3/4th inch, a distance which may be adjusted as needed. This publication also recognizes that the spacing between the rollers may be adjusted based upon the size of the meat being tenderized and flattened, the desired final thickness of the meat, as well as other factors apparent to those of skill in the art Further, U.S. Pat. No. 5,957,767 to Horton describes a meat tenderizing apparatus that includes an upper roller and a lower roller spaced from the upper roller. Meat to be tenderized is passed between the rollers, and the upper roller is adjustable to vary the spacing between the rollers to accommodate meats of various thicknesses. Horton also teaches a first dial to adjust the spacing between the upper and lower rollers and teaches a second dial that rotates the upper rollers. Horton teaches that the second dial may be driven by a motor.

Additionally, U.S. Pat. No. 4,531,259 to Bridge, Jr. teaches a meat tenderizer that includes a pair of rotary knives, one of which is fixed and another of which is floating. This arrangement allows the floating knife to move upwardly and downwardly to vary the spacing between the knives to accommodate contours of the meat to be tenderized. The floating knife is spring biased downward but is allowed to float as the size, shape, and contour of the mass passing between the knives changes. Additionally, Bridge, Jr. teaches manually setting the floating knife at a fixed position if a fixed spacing between the fixed and floating knives is desired.

However, all of these prior art documents fail to teach or suggest automatically adjusting the spacing between the rollers based on one or more inputs made to a remote control panel or other interface, e.g., a "recipe" setting the parameters of the food processing process. Therefore, it is desirable to develop a control system for a food product processing system that enables the operating parameters of the system to be automatically and remotely adjusted to accommodate a change in the type or final condition of a food product being processed by the system.

SUMMARY OF THE INVENTION

Thus, according to one aspect of the present invention, a food processing system including a macerator is provided in which a control system having a remote user/operator input is operably connected to the macerator and other components of the system. By inputting certain operating conditions into the remote input, the control system automatically adjusts the operating parameters of the macerator and the other components of the system to accommodate the desired processing of the incoming food products and, in the case of a macerator, includes the spacing between the knife shaft rollers and the cutting speed of the rotating knives, in addition to the tension or force of the rotating rollers or knife shafts.

According to another aspect of the present invention, the control system includes stored data corresponding to a number of preset conditions for use with various types or recipes for different food products. Therefore, when an input is made corresponding to a particular food product, the control system can automatically adjust the settings for each of the various devices included within the system to optimize the food processing system for the production of the desired food product.

According to still another aspect of the present invention, the input for the control system can be located at any point on the food processing system, or can be disposed at a remote point from the food processing system in order to enable the food processing system to be controlled from a location other than that at which the food processing system is disposed.

According to still a further aspect of the present invention, the control system includes a product detection system that determines the height profile of the product entering the system. The height profile can be either mechanically or wirelessly determined, and is utilized by the control system to dynamically space the rollers or knives for the particular product.

According to still another aspect of the present invention, the food processing system can include a dynamic adjustment mechanism for the rotating shafts on which the rollers or knives are mounted. The adjustment mechanism enables one shaft to move with respect to the other shaft in order to accommodate a piece of a food product passing between the shafts. The mechanism uses an air cylinder to apply a constant pressure against the food product as it passes between the shafts to uniformly engage the food product. The air cylinder enables the movable shaft to adjust its position relative to the fixed shaft in order to provide the uniform engagement of the food product.

Numerous other aspects, features and advantages of the present invention will be made apparent from the following detailed description taken together with the drawing figures.

BRIEF DESCRIPTION OF THE DRAWINGS

The drawings illustrate the best mode currently contemplated for practicing the present invention.

In the drawings:

FIG. 15 is an isometric view of another alternative embodiment of the internal components of the macerator of FIG. 6.

DETAILED DESCRIPTION OF THE INVENTION

Figure 1:
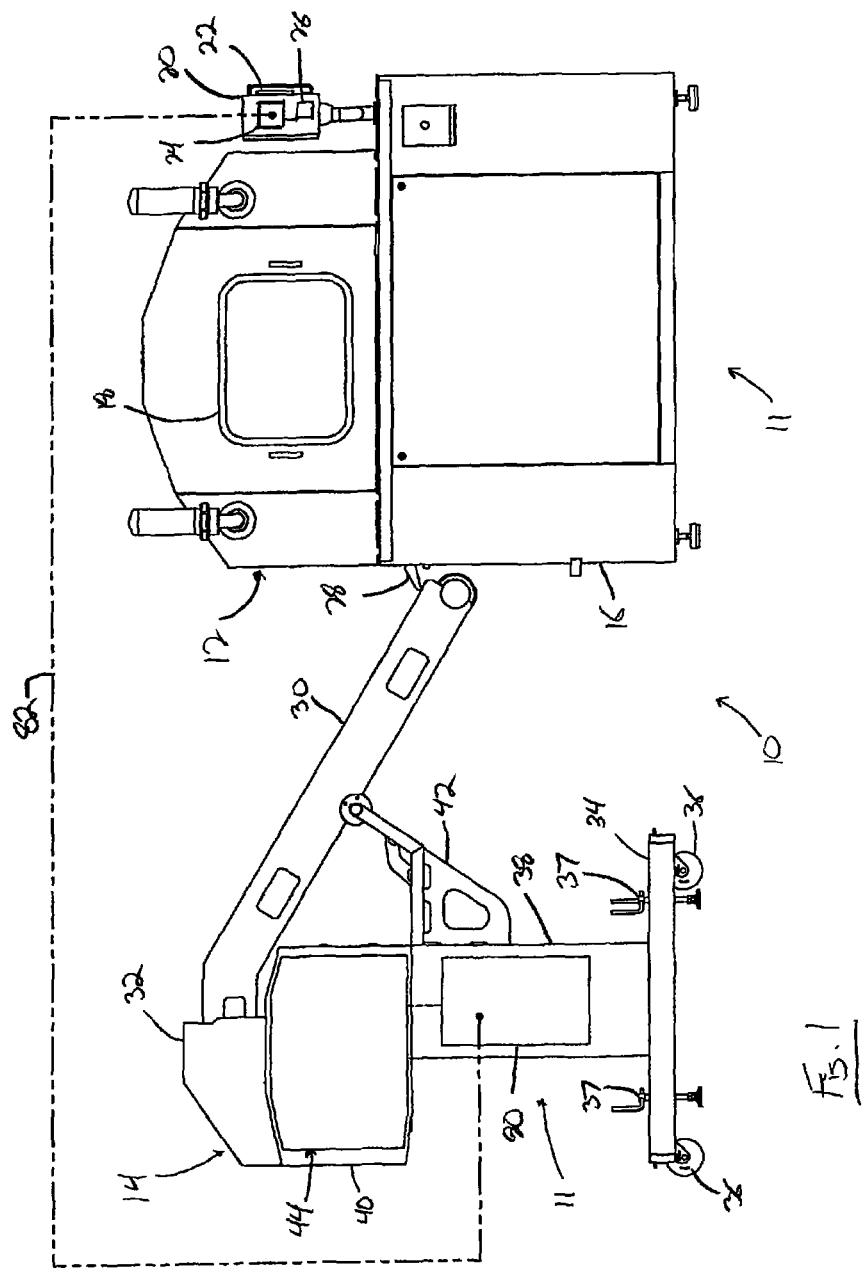
FIG. 1 is a front plan view of a food processing system including an injector and macerator each connected to a control system constructed according to the present invention.

With reference now to the drawing figures in which like reference numerals designate like parts throughout the disclosure, one embodiment of a food processing system utilized in the present invention is indicated generally at 10 in FIG. 1. The food processing system 10 can include any number of suitable processing devices 11, which in the illustrated embodiment are an injector 12 and a macerator 14.

The injector 12 can be any suitable injector utilized for injecting or otherwise introducing a solution, such as a marinade, into a food product (not shown) that has been introduced into the injector 12. One suitable type of injector 12 is the IMAX 620 manufactured by Schroeder of Germany. In FIG. 1, the illustrated injector 12 includes a frame 16 including a hatch 18 through which the food product to be processed can be introduced into the injector 12. The internal components of the injector 12, such as the injection needles, inject solution valves, walking beam conveyor or belt-type conveyor, among others, are well-known in the art and are utilized to effectively inject the desired solution into the food product to achieve an optimal condition for the product prior to further processing, such as massaging, pack-off, and/or cooking. The inject or marinade supplied to the injector 12 can come from a number of different sources, such that different types of injects, solutions and/or marinades can be supplied to the injector 12 for use with various types of food products.

To control the type and amount of the solutions supplied to the injector 12 during its operation, the injector 12 includes a control box 20 that is utilized to control both the operation of the injector 12 and the flow of the various solutions to the injector 12. The control box 20 includes various input devices 22, such as buttons, switches, keypads or other suitable hard wired or wireless input devices, that enable an individual to select the operating parameters for the injector 12 to process a particular food product to be positioned within the injector 12. The control box 20 may also include a suitable electronic central processing unit (CPU) 24 and electronic storage medium 26 in which is stored a number of preset operating parameters for the injector 12 that correspond to the desired settings for the injector 12 for use in processing certain types of food products. Thus, by providing a particular input through the device 22 on the control box 20, the CPU 24 can access the operational settings in the medium 26 associated with that input and can properly configure the injector 12 for use in processing the particular food product.

From the injector 12, the food product is transferred via a chute 28 onto a conveyor 30 or another chute. The conveyor 30 is connected to the macerator 14 and advances the food product upwardly towards an inlet 32 for the macerator 14. As best shown in FIG. 1, the macerator 14 is illustrated as including a base 34 having a number of wheels 36 and stationary supports 37 that are movable with respect to the base 34 to selectively disengage the wheels 36 from a support surface, i.e., a floor, and prevent the macerator 14 from moving. A vertical support 38 extends upwardly from the base 34 and supports a housing 40 opposite the base 14. The support 38 is also connected to a support arm 42 that extends outwardly from one side of the support 38 and is used to support the conveyor 30 on the macerator 14.

Figure 2:
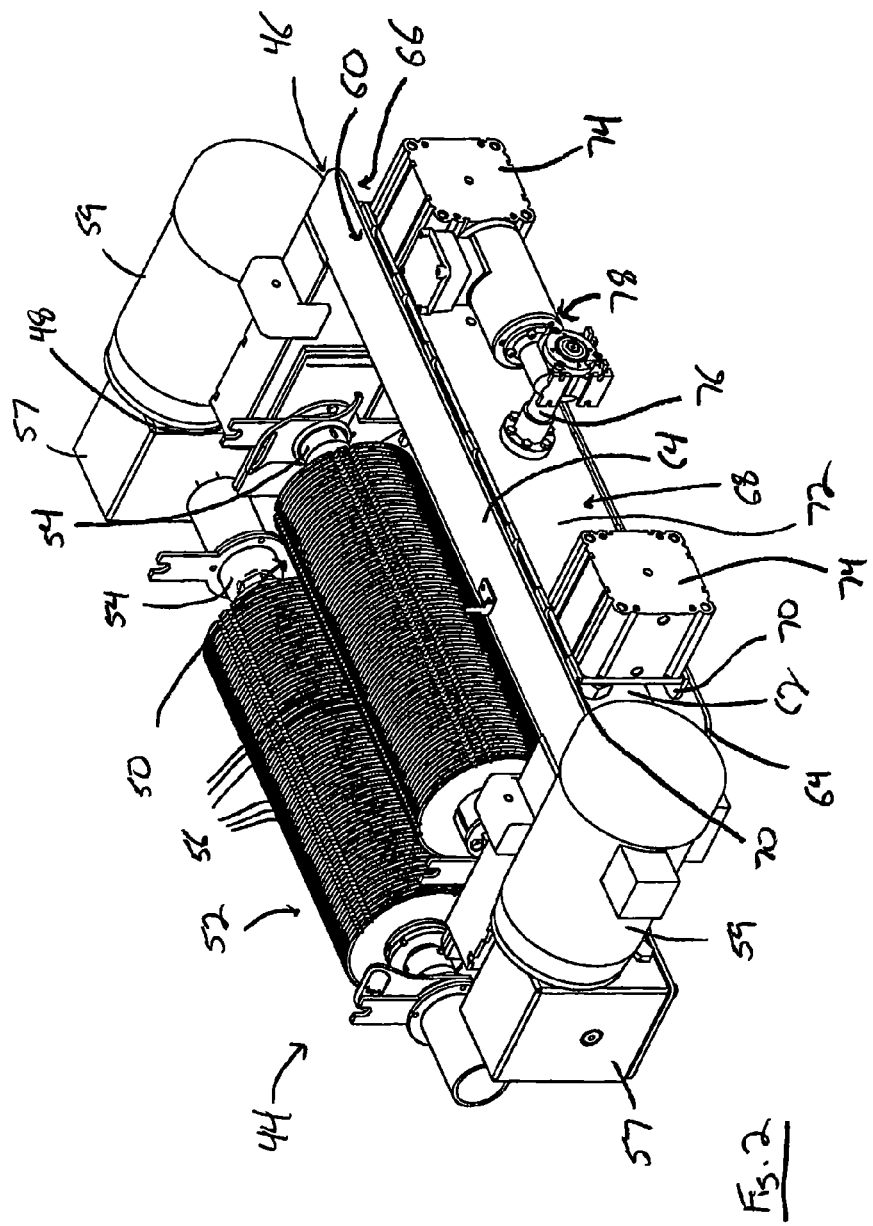
FIG. 2 is an isometric view of the internal components of the macerator of the system of FIG. 1.
Figure 3:
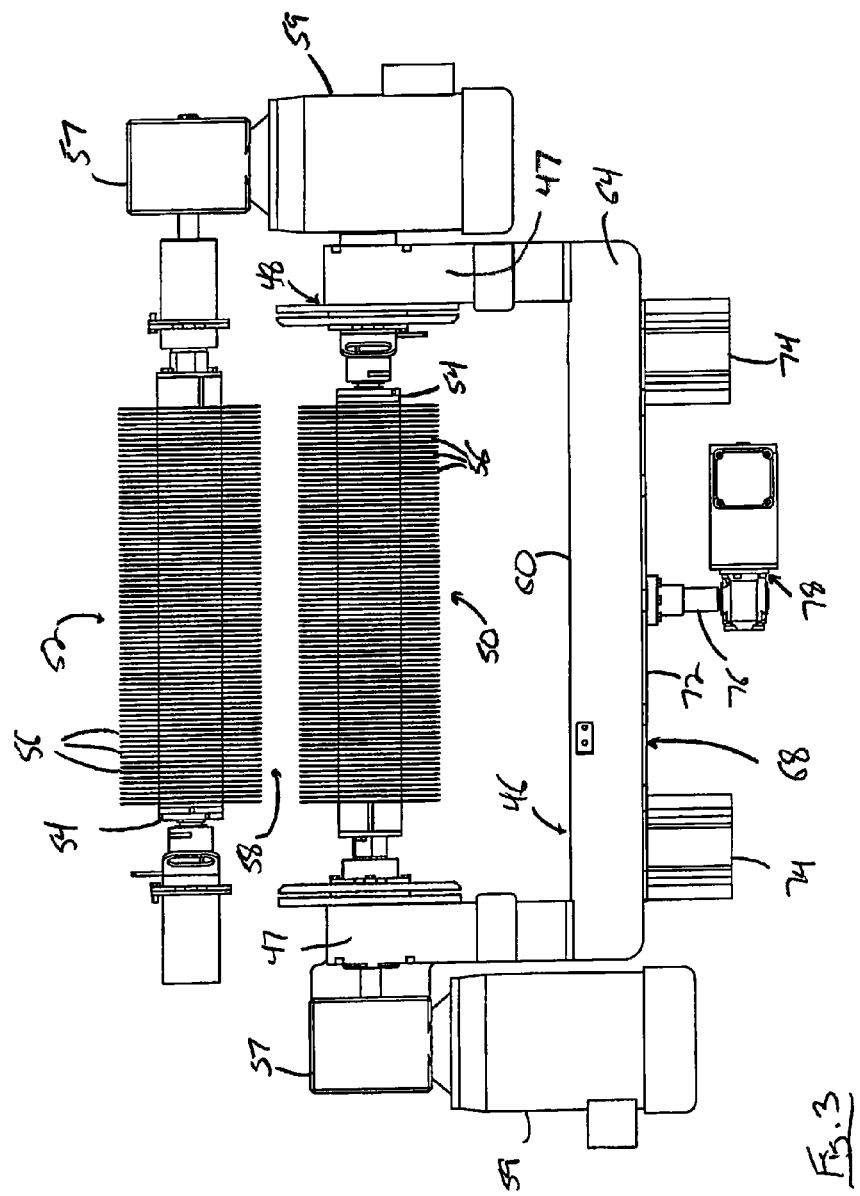
FIG. 3 is a top plan view of the internal macerator components of FIG. 2.

Looking now at FIGS. 2 and 3, the housing 40 for the macerator 14 encloses a tenderizing mechanism 44 that is disposed directly beneath the inlet 32 to receive the food product from the conveyor 30 through an open upper end of the housing 40. The mechanism 44 includes a frame 46 that is generally U-shaped, and supports a first rotary knife roller 50 across the open end 48 of the frame 46 between a pair of arms 47 of the frame 46. Positioned adjacent the first roller 50 is a second rotary knife roller 52 that is rotatably mounted to the housing 40. The first roller 50 and the second roller 52 are similarly constructed with a central shaft 54 and a number of knife blades 56 disposed around the shaft 54 and spaced equidistant from one another along the length of the shaft 54. The central shaft 54 of each roller 50 and 52 is operably connected to a motor 57 that is operable to rotate the shafts 54, and consequently the blades 56 on each of the rollers 50 and 52.

The roller 52 is affixed to the housing 40 in a manner that enables the roller 52 to rotate with regard to the housing 40 while also positioning the roller 52 a short distance from the first roller 50 to provide a space 58 between the blades 56 on each roller 50 and 52. Each roller 50 and 52 also includes an air cylinder 59 operably connected to the motor 57 to be used to back out the rollers 50 and 52 to free any blockages that become engaged between the rollers 50 and 52, such as a metal object that cannot be cut by the blades 56.

The first roller 50 is operably connected to the arms 47 of the frame 46 at each end, and the corresponding motor 57 and air cylinder 59 for the first roller 50 is also connected to the frame 46 for movement therewith. The central portion 60 of the frame 46 is formed with a center panel 62 and a pair of side panels 64 extending outwardly from opposed sides of the center panel 62 to define a channel 66 therebetween. Within the channel 66 is received a slide 68 that generally conforms in shape to the channel 66. The slide 68 includes a pair of flanges 70 that extend outwardly from a body 72 affixed to the housing 40 by a pair of braces 74. Also secured to the body 72 is an adjustment shaft 76 that extends through the body 72 into engagement with the center panel 62 of the frame 46. The shaft 76 is operably connected to a servomotor 78 or other suitable motive mechanism, such as a stepper motor, a geared head motor with sensors, etc., to control the operation of the shaft 76. When the shaft 76 is extended by the motor 78, the shaft 76 operates to push the frame 46 away from the slide 68, thereby moving the first roller 50 closer to the second roller 52. Additionally, when the shaft 76 is retracted by the motor 78, the frame 46 is moved closer to the slide 68, increasing the size of the space 58 between the first roller 50 and second roller 52.

To control the operation of the servomotor 78 and the corresponding position of the frame 46 and first roller 50, the servomotor 78 is operably connected to a separate control box 80 disposed in the support 38 of the macerator 14, which in turn is operably connected to the control box 20 on the injector 12. The operable connection 82 made between the control box 80 and the control box 20 can be any suitable connection, such a hard wired or wireless connection.

Because of the connection 82 between the control box 80 and the control box 20, the inputs 22 on the control box 20 are also able to control the operation of the servomotor 78 to properly position the first roller 50 with respect to the second roller 52. As a result, the operation of the servomotor 78 and corresponding position of the first roller 50 can be determined utilizing the information stored in the medium 26 associated with the information utilized to select the parameters for the injector 12 to process a particular type of food product. In this manner, by simply selecting an input associated with a particular food product, the settings for the injector 12 and/or the macerator 14 can be automatically and remotely adjusted to accommodate the selected food product. Further, in one embodiment for the invention, the information stored in the electronic storage medium 26 for a particular food product can be accessed and utilized to adjust the injector 12 and/or macerator 14 by depressing a single button or switch on the control box 20 that corresponds to the selected food product. In this manner, the settings for the injector 12 and macerator 14 can be simultaneously and automatically adjusted from a single and remote source, negating the need for multiple adjustments on each device 11.

Figure 4:
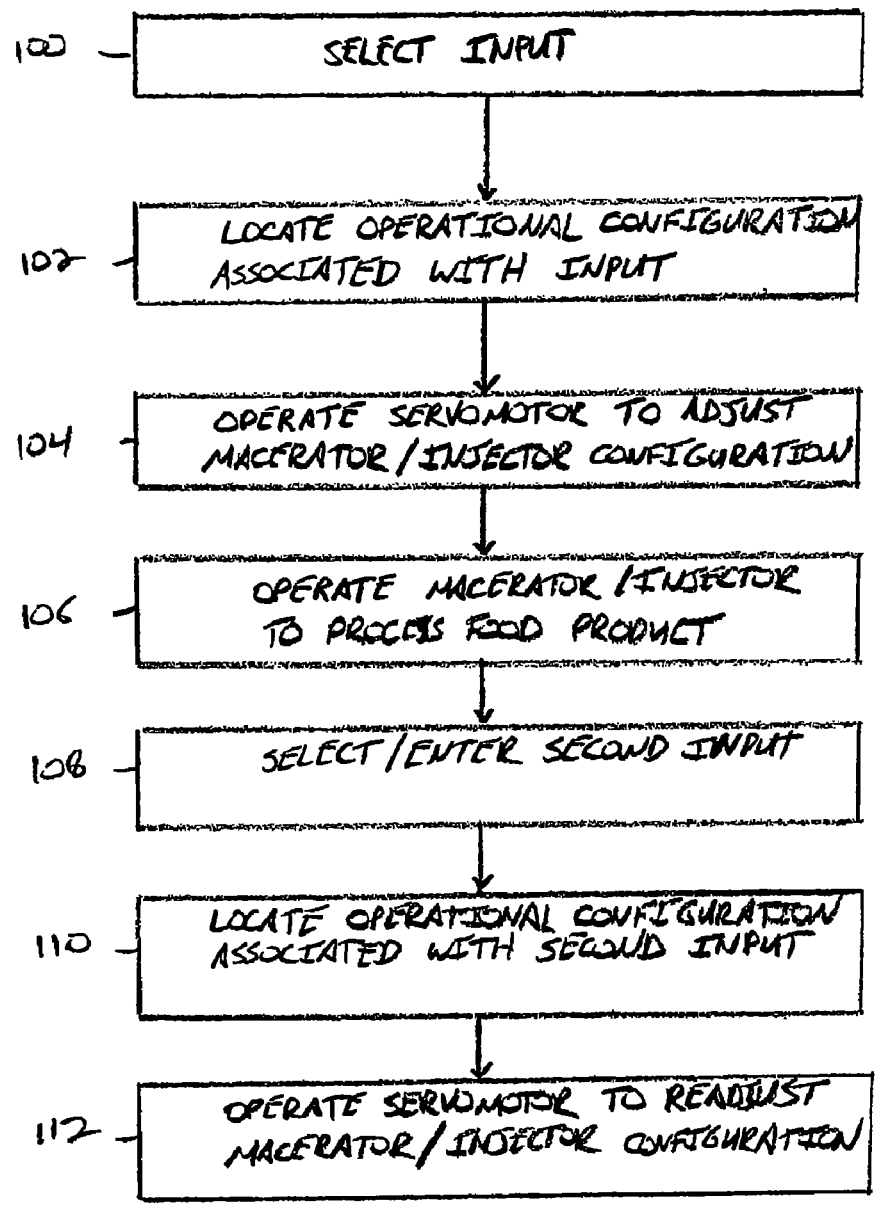
FIG. 4 is a block diagram illustrating the process for operating the control system to alter the operational configuration for the food processing system of FIG. 1.
Figure 5:
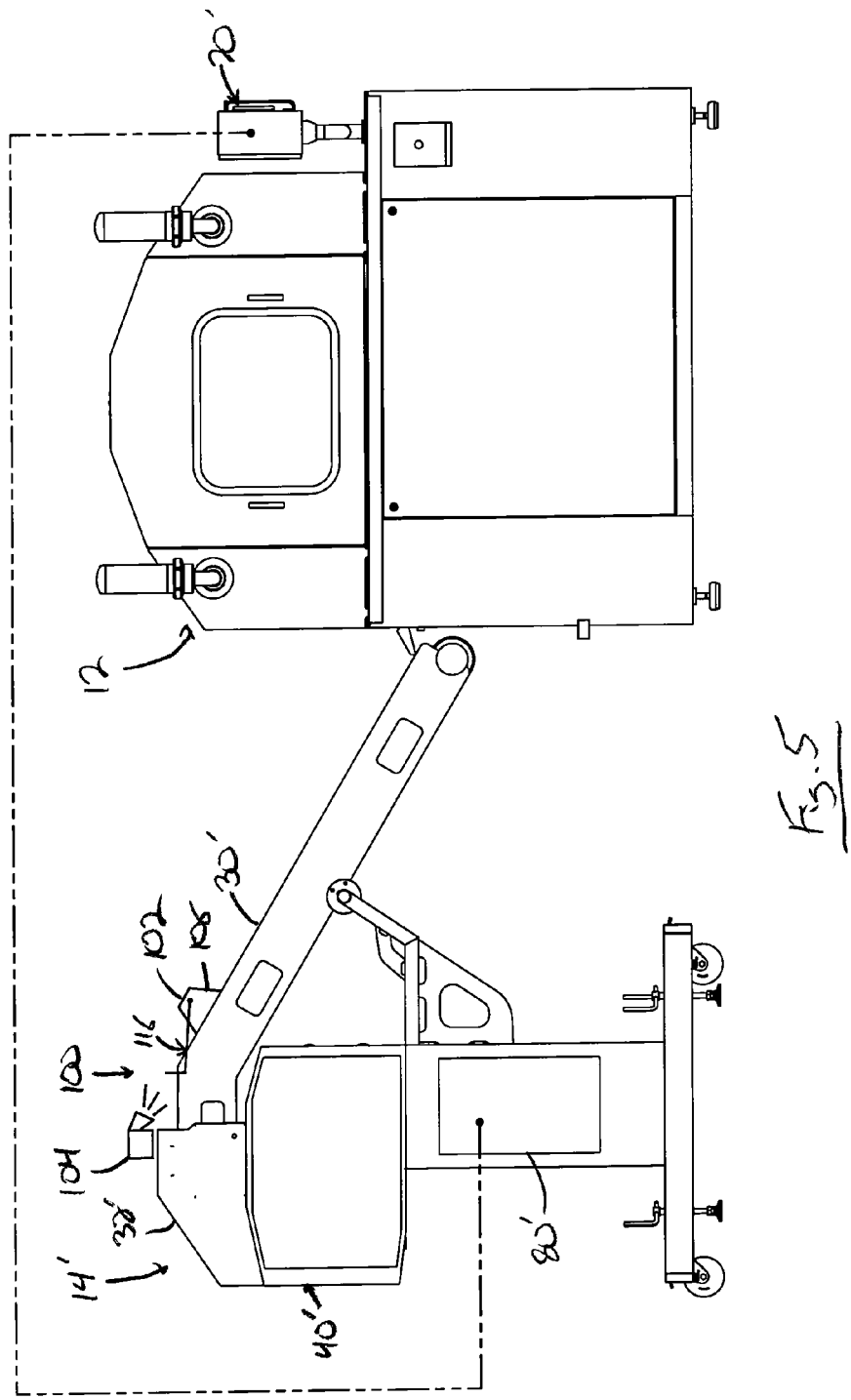
FIG. 5 is a front plan view of a second embodiment of the food processing system of the present invention.
Figure 6:
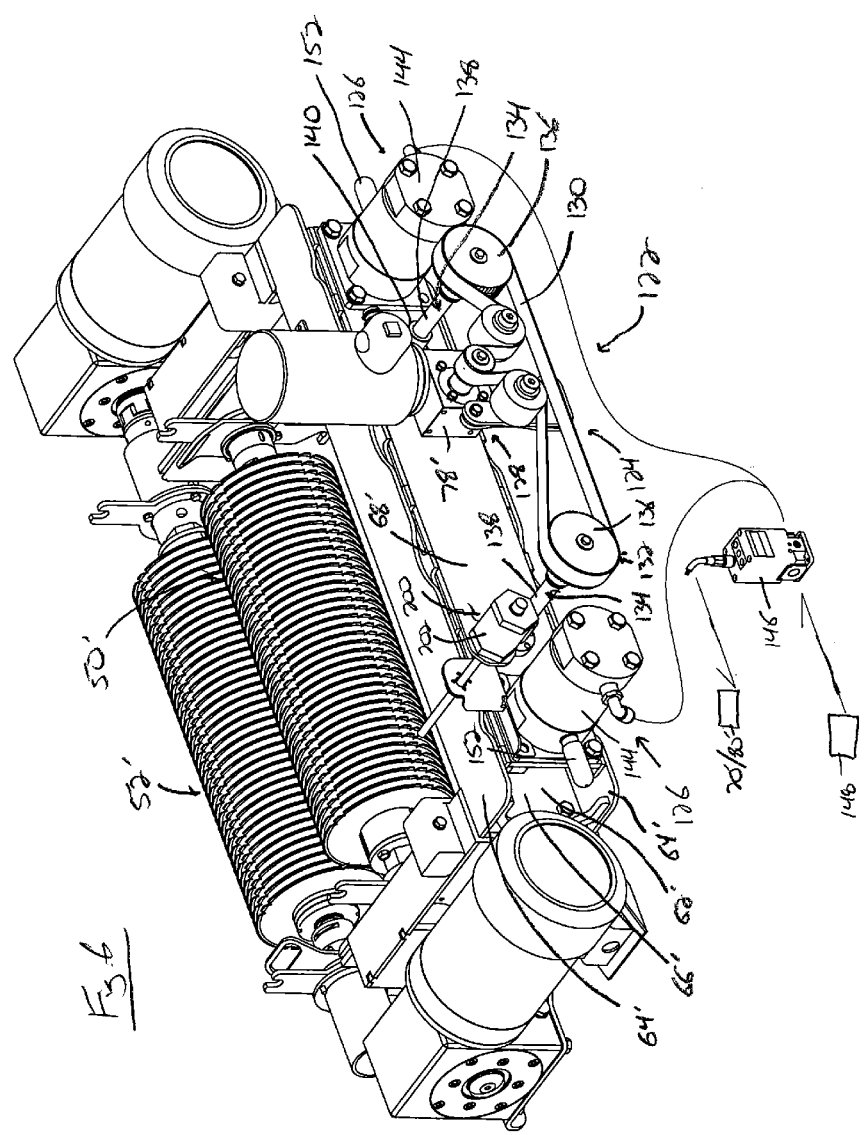
FIG. 6 is an isometric view of the internal components of the macerator of the system of FIG. 5.
Figure 7:
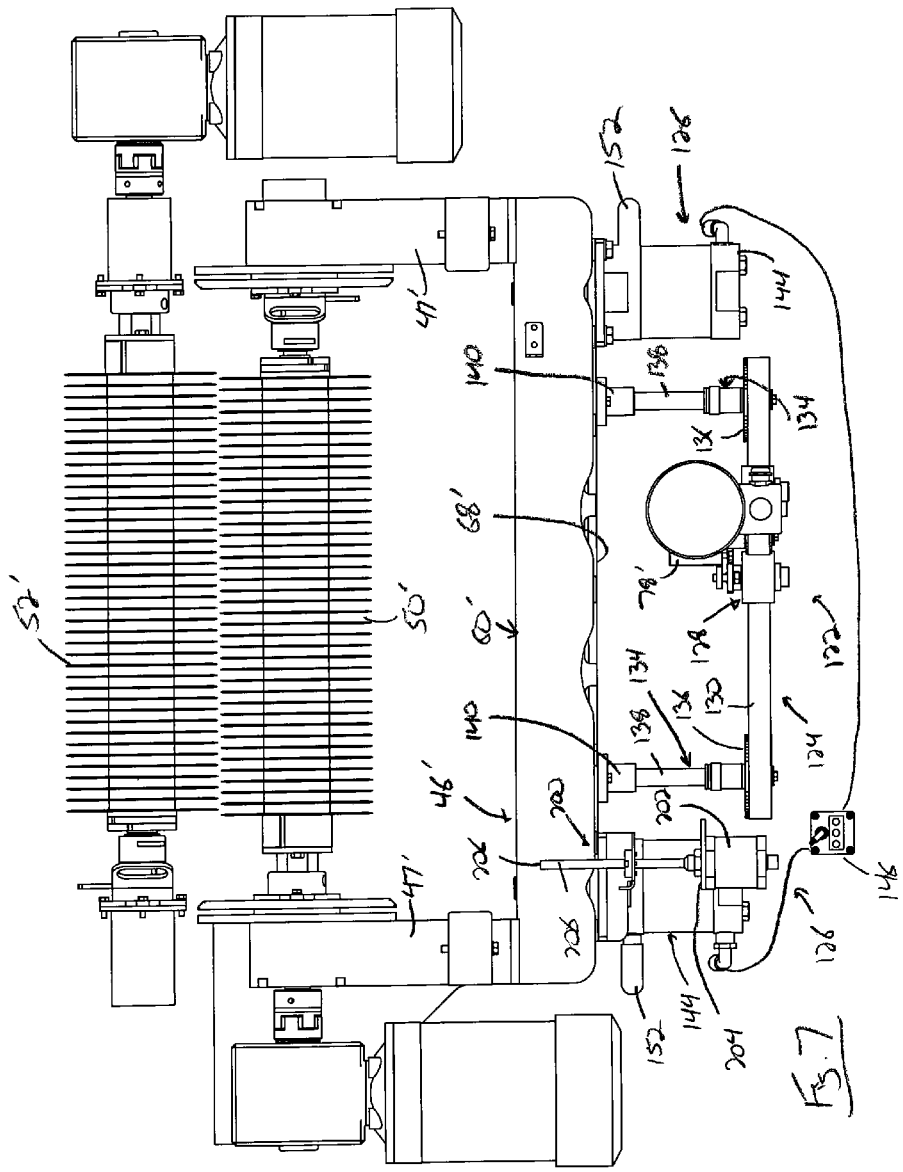
FIG. 7 is a top plan view of the internal macerator components of FIG. 6.

In operation, as shown in FIG. 4, initially in block 100 an individual selects an input on the control box 20 corresponding to a particular food product to be processed by the injector 12 and the macerator 14. Upon receiving the desired input, in block 102 the CPU 24 of the control box 20 accesses the storage medium 26 to determine the proper configuration or setting for the first roller 50 and for the adjustable component(s) in the injector 12. Once the proper settings for these items are located, in block 104 the CPU 24 of the control box 20 sends a signal to the servomotor 78 on the macerator 14 and to the associated motor, valve or other motive member in the injector 12 to adjust the position or other operational configuration for the first roller 50 in the macerator 14 and other adjustable component(s) in the injector 12. At block 106, after the adjustable components have been properly configured and verified in a closed loop feedback system, the injector 12 and macerator 14 are activated to process the particular food product.

When it is desired to process a different food product in the system 10, or to process the same product according to a different set of desired parameters or qualities, in block 108 another input is entered on the control box 20. The parameters or settings for the adjustable components of the injector 12 and associated macerator 14 are determined in block 110 and the CPU 24 of the control box 20 sends another signal to the appropriate motive members in block 112 to reposition the adjustable components as necessary prior to processing the following food product.

In an alternative embodiment, the control box 20 can be disposed on the macerator 14 in place of or in conjunction with the control box 80, which can be disposed on the injector 12 to control the operation of the injector 12. The box 20 when disposed on the macerator 14 can be utilized to adjust the settings of the macerator 14 and the injector 12, or the macerator 14 alone. Additionally, in those embodiments where the control box 20 is able to receive and/or transmit wireless signals, the inputs 22 can be removed from the control box 20 and disposed on a remote transmission device (not shown) such as a suitable hand-held device that can transmit wireless signals to the box 20, or via an Internet connection to a suitable locally disposed device, such as a router, that relays the signals to the box 20.

The present invention thus allows an operator to select the operating parameters of a processing device such as a macerator, including the spacing between the knife shaft rollers and the cutting speed of the rotating knives, in addition to the tension or force of the rotating rollers or knife shafts. In the case of a double macerator that includes two sets of independently operated and controlled knife rollers, the parameters of the two sets of knife rollers can be controlled and adjusted together or separately according to the desired processing of the particular food product.

In another alternative embodiment, the mechanism 44 can be utilized to retrofit existing macerators 14 that include a handwheel adjustment mechanism to enable the settings for the macerators 14 to be automatically and/or remotely adjusted utilizing the control box 20 and servomotor 78.

Looking now at FIGS. 5-11, a second embodiment of the macerator 14' is illustrated for use in the system 10. The macerator 14' is constructed similarly to the macerator 14 in the system 10 of FIG. 1, with the addition of a food product profile and/or height detection system 100. The system 100 includes a mechanical mechanism 102 and an electromagnetic wave mechanism 104, through either mechanism 102, 104 can be utilized independently of the other.

The mechanism 104 is mounted to the housing 40' for the macerator 14', such as adjacent the inlet 32' for the macerator 14', and is directed at the conveyor 30'. Various suitable types of electromagnetic waves, e.g., radio waves, light, etc., are emitted from the mechanism 104 towards food product (not shown) located on the conveyor 30'. By reflecting the radiation off of the product, i.e., using radio waves, or by determining the position of various points on the product relative to reference points on the conveyor 30' or in the mechanism 104, i.e., using light waves, the mechanism 104 can determined the height profile for the product moving up the conveyor 30'.

Alternatively, or in conjunction with the mechanism 104, a mechanical mechanism 102 can determine the height profile of the product moving up the conveyor 30'. The mechanical mechanism 102, as best shown in FIGS. 5 and 10-12, includes a pair of mounting brackets 106 secured to opposed sides of the conveyor 30'. The brackets 106 extend upwardly from the conveyor 30' and support a bearing flange mount 108. The bearing mounts 108 include bearings (not shown) therein that enable an actuator 110 to be mounted thereto on a rod 109 extending between the mounts 108. The rod 109 extends through the bearing mount 108 and is engaged with a positional sensor 114 located on the outside of the conveyor 30'. Within the conveyor 30', the shaft 112 includes a number of actuating fingers 116 that extend radially outwardly from the shaft 112. The fingers 116 have a first portion 118 extending from the shaft 112 and a second portion 120 disposed at an angle with regard to the first portion 118. The first portion 118 extends away from the shaft 112 in a direction, e.g., along the length of the conveyor 30' in either direction, that allows food products moving along the conveyor 30' to engage the fingers 116 to rotate the fingers 116, shaft 112 and rod 109 with respect to the mount 108 and sensor 114. This rotation enables the sensor 114 to measure the height of the food product based on the amount of rotation of the rod 109 and shaft 112 in a known manner. Further, the direction that the second portion 120 of the fingers 116 extend relative to the first portion 116 is selected in order to enable the food product contacting the fingers 116 to easily deflect and rotate the fingers 116 away from the conveyor 30' to avoid urging the fingers 116 against the conveyor 30'.

Using one or both of the mechanical mechanism 102 and/or electromagnetic wave mechanism 104, the height of the food product moving towards the inlet 32' along the conveyor 30' can be determined. Due to a connection between the mechanism 102 and/or 104 and the control box 20' and/or 80', the determination of the height of the food product by the mechanisms 102 and/or 104 can be utilized by the control box 20' and/or 80' to use the positioning mechanism 122 to vary the position of the movable roller 50' from the parameters set by the control box 20' and/or 80' to accommodate the height of the individual products passing through the macerator 14'. In this manner, while the preset spacing of the rollers 50' and 52' for the particular food product treated by the macerator 14' is initially set by the operator via the control box 20' and/or 80', this spacing can be continuously and dynamically varied by the measurements obtained by the mechanisms 102 and/or 104 as needed for the particular food products being treated.

The measurements of the mechanisms 102 and 104 can also be utilized to initiate the operation of the macerator 14' via the control box 20' and/or 80'. For example, when no product is detected by the mechanisms 102 and/or 104, the control box 20'/80' can switch off the rotation of the rollers 50' and 52', to reduce the power consumption of the macerator 14', among other reasons. Once food product is sensed by either or not mechanisms 102 and/or 104, the control box 20'/80' can start up the rotation of the rollers 50' and 52' to prepare for the entrance of the food product into the macerator 14'. Similarly, once no more food product is sensed by the mechanisms 102 and/or 104, the control box 20'/80' can switch off the rollers 50' and 52' until food product is again sensed on the conveyor 30'.

In addition to a response to the measurements of the mechanisms 102, 104, the preset operating conditions (roller spacing, rotational speed, pressure applied to food product, etc.) stored therein, or a combination of the two, the position of the roller 50' can be adjusted through the operation of a positioning mechanism 122, best shown in FIGS. 6-9. The positioning mechanism 122 includes a preset adjustment mechanism 124 and a dynamic adjustment mechanism 126. The preset mechanism 124 is operably connected directly to the control box 20'/80' which controls the mechanism 122 including a motor 78', such as a servomotor, connected to a motive system 128, such as a serpentine belt 130, that is operably engaged with a pair of positioning members 132. The positioning members 132 can take the form of jack screws 134 each having a geared member 136 and a shaft 138. Upon operation of the motor 78', the motive system 128, e.g., belt 130, is moved by the motor 78' to move the positing members 132, e.g., to rotate the geared members 136 of each jack screw 134. When rotated, the geared members 136 consequently rotate the shafts 138 connected to the geared member 136 in the direction of rotation of the geared members 136 caused by the motor 78'.

Opposite the geared members 136, the shafts 138 are connected to or engaged with threaded sleeves 140 that are secured to a slide 68', which in turn is attached to a frame 46' that is movably, e.g., slidably, secured to the housing 40'. When the shafts 138 are rotated by the operation of the motor 78', the shafts 138 are rotated, causing the shafts 138 to move the slide 68' along the shafts 138 depending upon the direction of rotation of the shafts 138, and the corresponding interaction of the shafts 138 with the threaded sleeves 140 on the slide 68'.

The frame 46' is generally U-shaped, with a pair of spaced arms 47' that defined an open end 48' across which a roller 50' is rotatably mounted to the arms 47' to position the roller 50' adjacent a roller 52' that is rotatably mounted directly to the housing 40' for the macerator 14'. Opposite the open end 48', the frame 46' is formed with a central portion 60' including a center panel 62' and a pair of side panels 64' extending outwardly from opposed sides of the center panel 62' to define a generally U-shaped channel 66' therebetween. The slide 68' is received within the channel 66' and is operably connected to the center panel 62' of the frame 46' by a pair of air cylinder shafts 142 engaged with the center panel 62' at one end and which extend though apertures 145 in the slide 68' into engagement with an associated air cylinder 144 secured to the slide 68' at the opposite end. As a result of the connection between the slide 68' and the center panel 62' via the air cylinder shafts 142, the movement of the slide 68' in response to the operation of the motor 78' causes the center panel 62' and the frame 46', as well as the roller 50' mounted thereto, to move closer to or further from the fixed roller 52'. The amount of movement of the slide 68', and consequently the frame 46' and roller 50', relative to the roller 52' performed by the preset mechanism 124 can be controlled by the preset operating conditions selected utilizing the control box 20'/80' for the particular food product, with further adjustment also being able to be performed by user-directed adjustments input through the control box 20' and/or 80'.

In addition to connecting the slide 68' to the center panel 62' of the frame 46', the cylinders 144 form the motive part of the dynamic mechanism 126. In the mechanism 126, the slide 68' is dimensioned such that the slide 68' and channel 66' are relatively movable with respect to one another, and the slide 68' includes a pair of guide flanges 70' extending outwardly from the slide 68'. The flanges 70' extend toward the center panel 62' in a direction generally parallel to the side panels 64' to assist in maintaining the alignment of the slide 68' and the channel 66'. After the slide 68', and consequently the frame 46', has been positioned by the preset mechanism 122, the dynamic mechanism 126 enables the frame 46' to move relative to the slide 68' due to the operation of the air cylinders 144.

Figure 8:
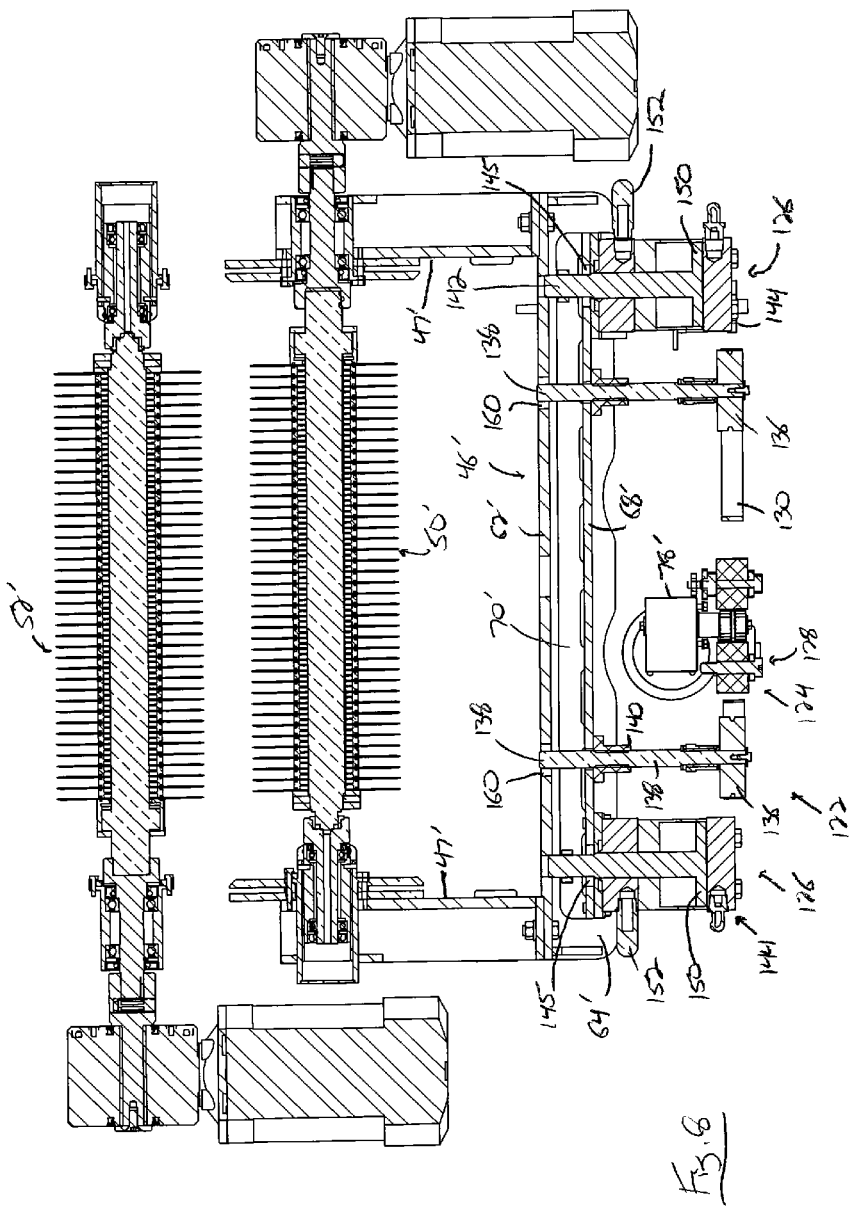
FIG. 8 is a cross-sectional view along line 8-8 of FIG. 6 showing the internal components in a first position.
Figure 9:
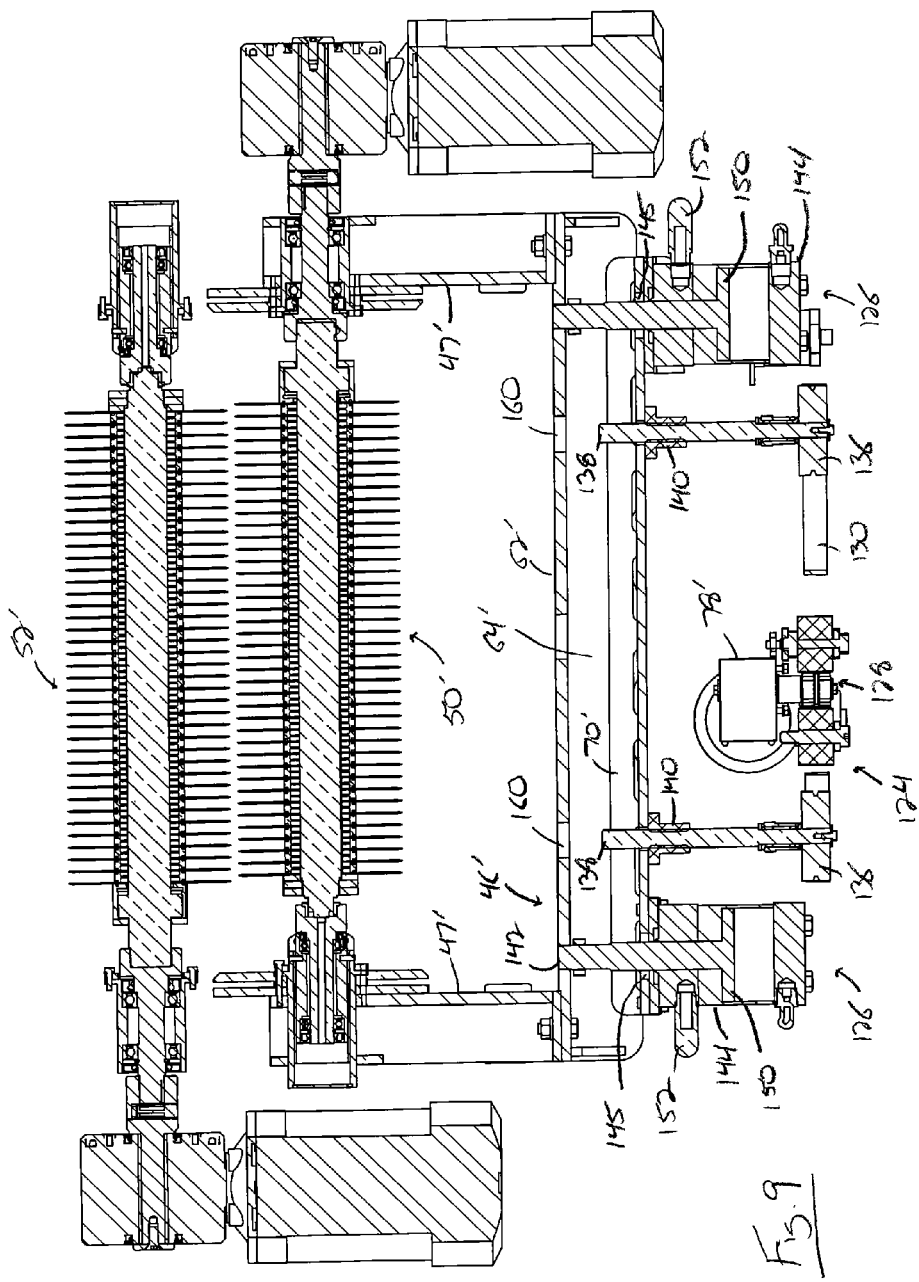
FIG. 9 is a cross-sectional view similar to FIG. 8 with the internal components in a second position.
Figure 10:
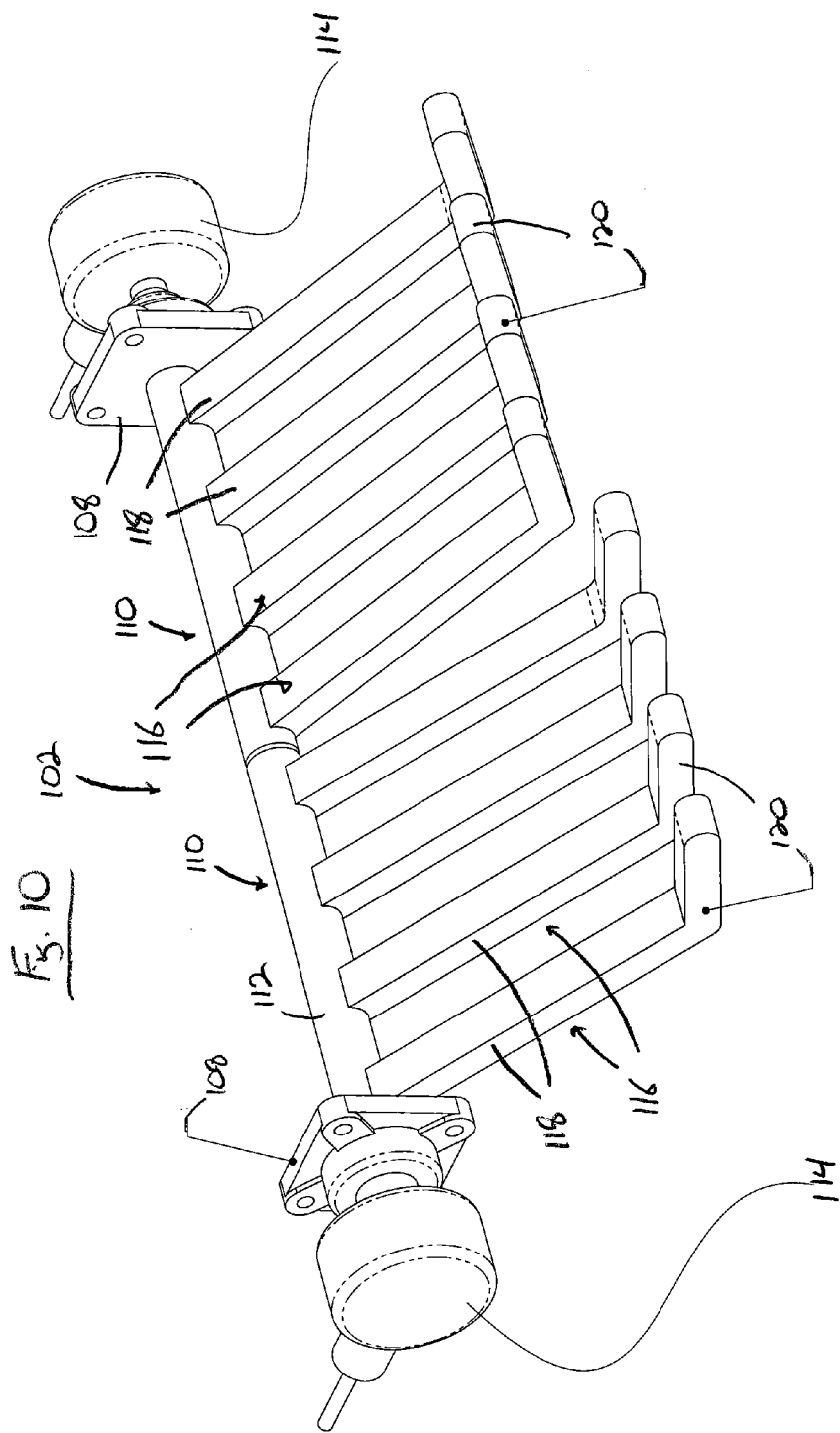
FIG. 10 is an isometric view of a mechanical product height detection mechanism of the system of FIG. 5.
Figure 11:
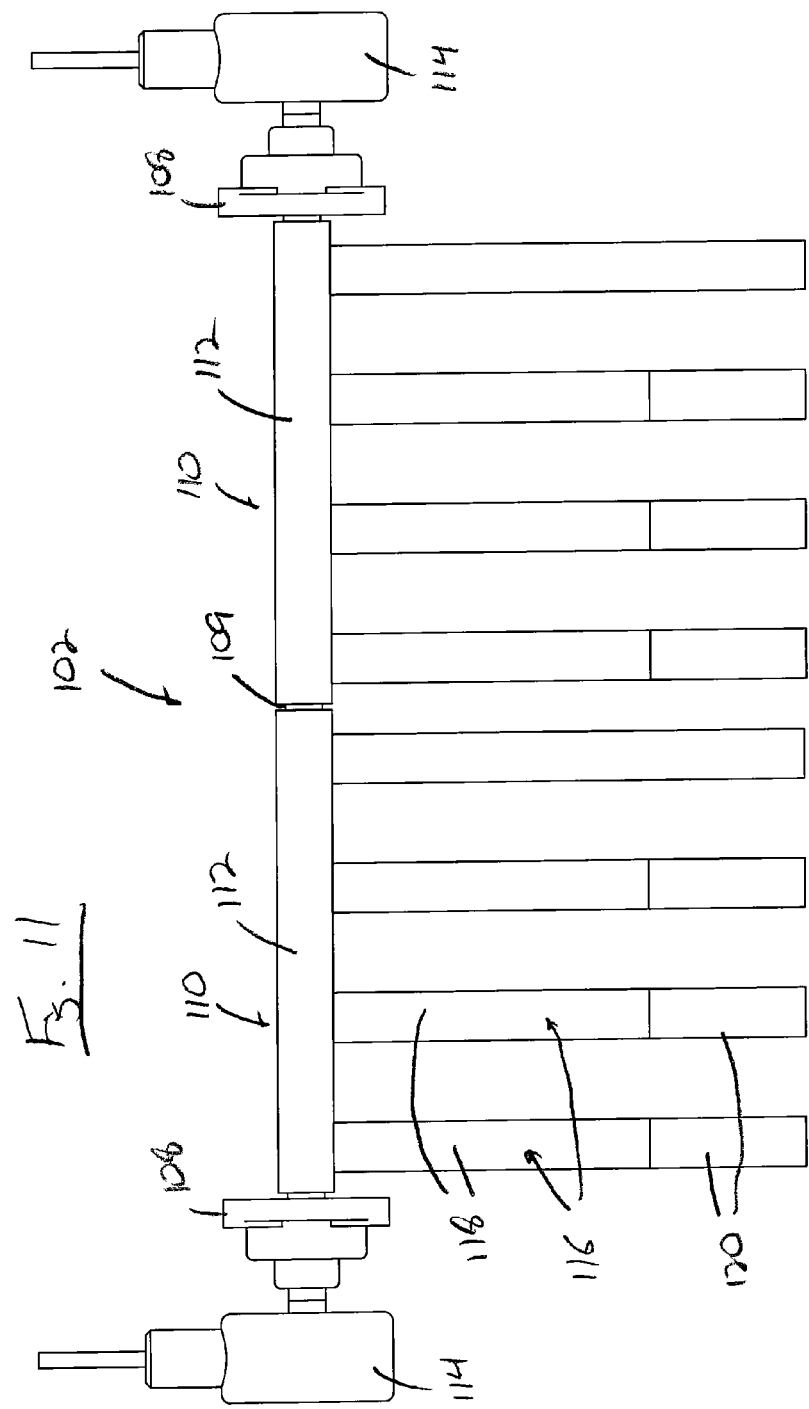
FIG. 11 is a top plan view of the mechanism of FIG. 10.
Figure 12:
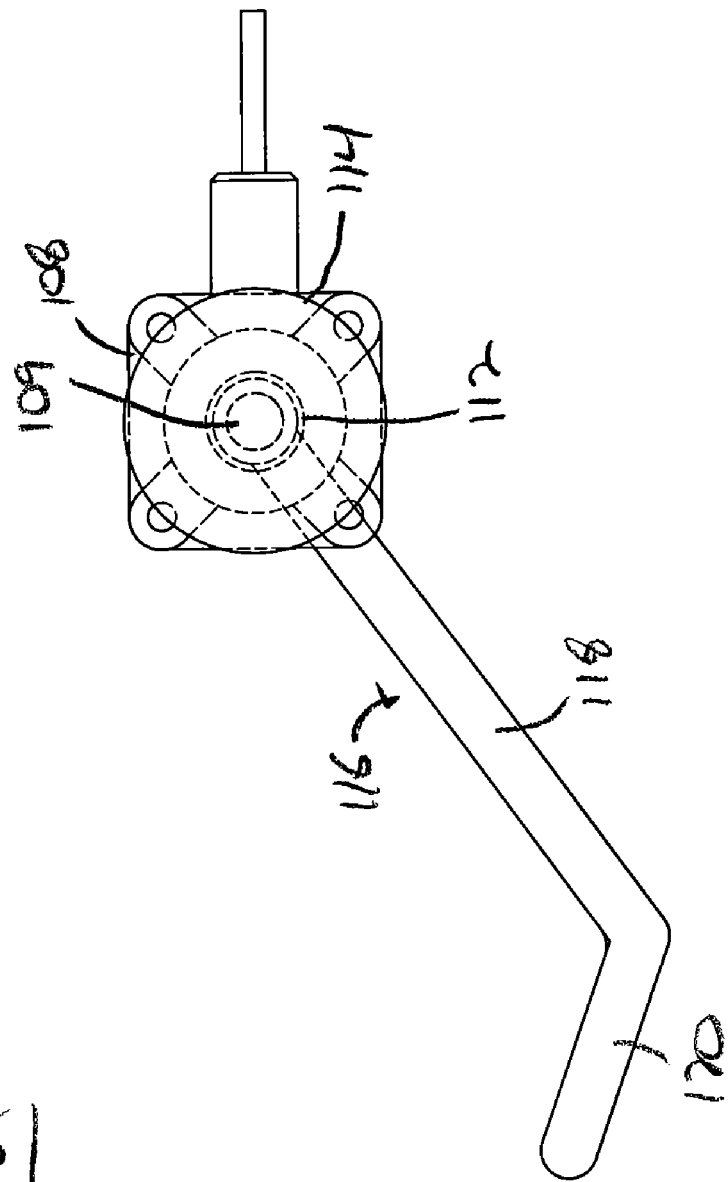
FIG. 12 is a side plan view of the mechanism of FIG. 10.

The cylinders 144 are operably connected to a controller 146 that is, in turn, operably connected to an air supply 148 and to the control box 20' and/or 80'. When a preset value for a particular food product has been selected utilizing the control box 20'/80', an air pressure value for the cylinders 144 is either associated with that preset value or separately entered using the control box 20'/80'. Once the air pressure value is determined, the controller 146 operates the air supply 148 to pressurize the cylinder 146 to the specified air pressure value. As a result, the air cylinder shaft 142 are biased outwardly from the cylinder 144 against the center panel 62' of the frame 46' with a force corresponding to the force of the pressurized air in the cylinder 144 acting on the piston 150 within the cylinder 144 to which the shaft 142 is attached. When a food product comes into contact with the rollers 50' and 52', the food product will exert a force on the rollers 50' and 52' as the rollers 50' and 52' exert a force on the food product to process it. Because the roller 52' is fixed to the housing 40', all of the force exerted by the food product on the rollers 50' and 52' will be directed at the roller 50'. If the force exerted by the food product exceeds the opposing force exerted on the roller 50' and frame 46' by the cylinders 144 via the shafts 142, such as when the food product is of larger than average size, the shaft 142 will be urged inwardly into the cylinder 144, as shown in FIG. 8. The controller 146 will sense the corresponding change in the air pressure within the cylinder 144, and will operate the cylinder 144 to relieve the air pressure within the cylinder 144 to maintain the air pressure constant within the cylinder 144, thereby maintaining a constant biasing force against the frame 46' and roller 50'. Conversely, if the food product engaged by the roller 50' is of smaller than average size, the controller 146 will sense the outward movement of the shaft 142 from the cylinder 144 and resulting pressure drop, and will operate the cylinder 144 to increase the pressure within the cylinder 144 accordingly to move the roller 50' towards the roller 52', as shown in FIG. 9. To do so, depending upon whether the controller 146 senses an increase or decrease in the pressure within the cylinder 144, the controller 136 will correspondingly decrease the air pressure by operating a relief valve 152 on the cylinder 144, or increase the air pressure by causing the air supply 148 to supply more air to the cylinder 144. Depending upon the nature of the operation taken by the controller 146 in response to the change in pressure within the cylinder 144, the roller 50' will move towards or away from the roller 52' to maintain the consistent engagement of the roller 50' with the food product. In this manner, the roller 50' is able to dynamically move in response to the shape and/or consistency of the individual food product engaged by the roller 50' to engage the food products with a constant amount of force, and produce similarly processed food products regardless of the particular size of the individual products.

Additionally, as the shafts 142 extend from the cylinder 144 to move the roller 50' towards the roller 52', the ends of the shafts 138 in the preset adjustment mechanism 124 opposite the gears 136 can extend through apertures 160 formed in the slide center panel 62', to avoid any interaction between the center panel 62' and shafts 138 from interfering with the operation of the dynamic adjustment mechanism 126.

In addition, whether the roller 50' is moved as a result of the operation of the preset mechanism 124 or the dynamic mechanism 126, the actual position of the roller 50' can be constantly monitored by the use of a positioning sensor 200.

The sensor 200 includes a housing 202 secured via a suitable bracket 204 or other member to the housing 40'. A probe 206 extends outwardly from the housing 202 towards the roller 50' such that the tip 208 of the probe 206 is positioned adjacent the roller 50'. In one embodiment, the probe 206 is configured as a magnetic transducer to detect the position of the roller 50' as a result of the magnetic interaction of the probe 206 with the roller 50'. In response to the position of the roller 50' sensed by the sensor 200, the position of the roller 50' can be adjusted, if necessary, or monitored during the operation of the macerator 14'.

Figure 13:
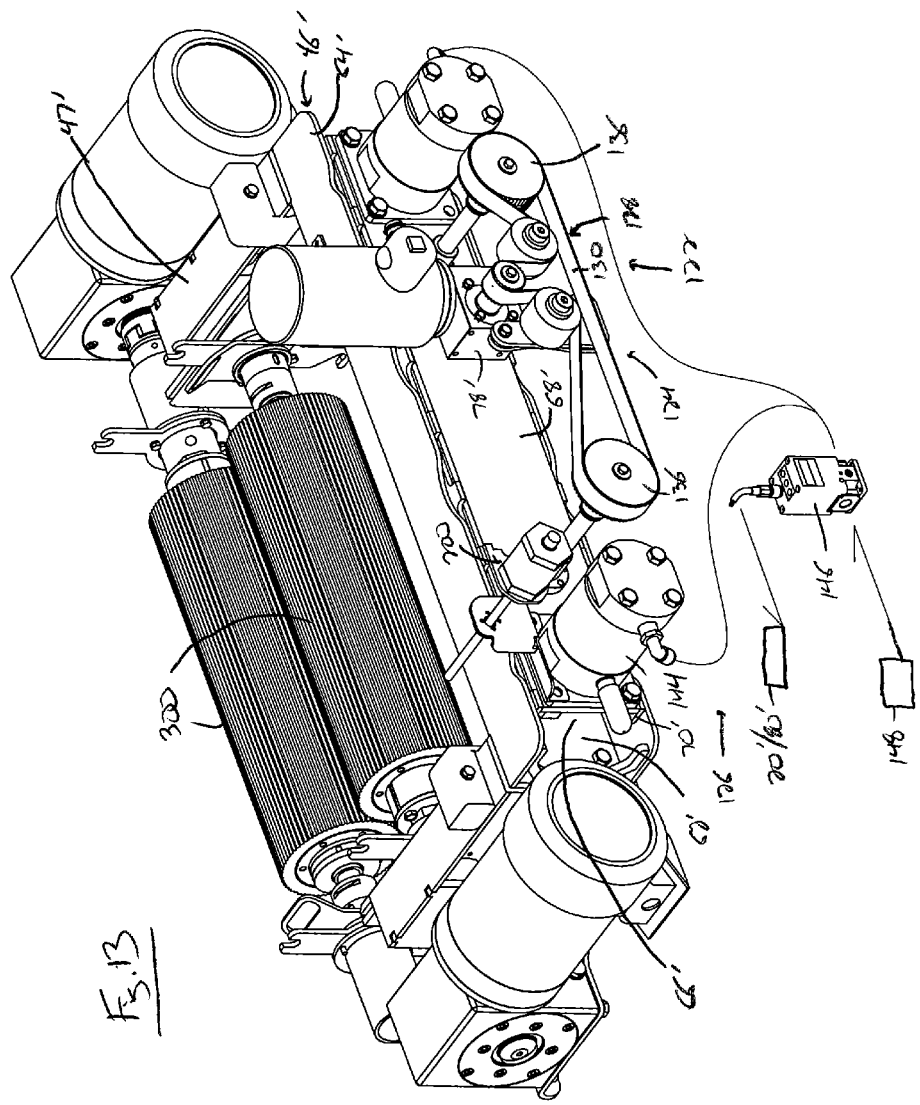
FIG. 13 is an isometric view of an alternative embodiment of the internal components of the macerator of FIG. 6.
Figure 14:
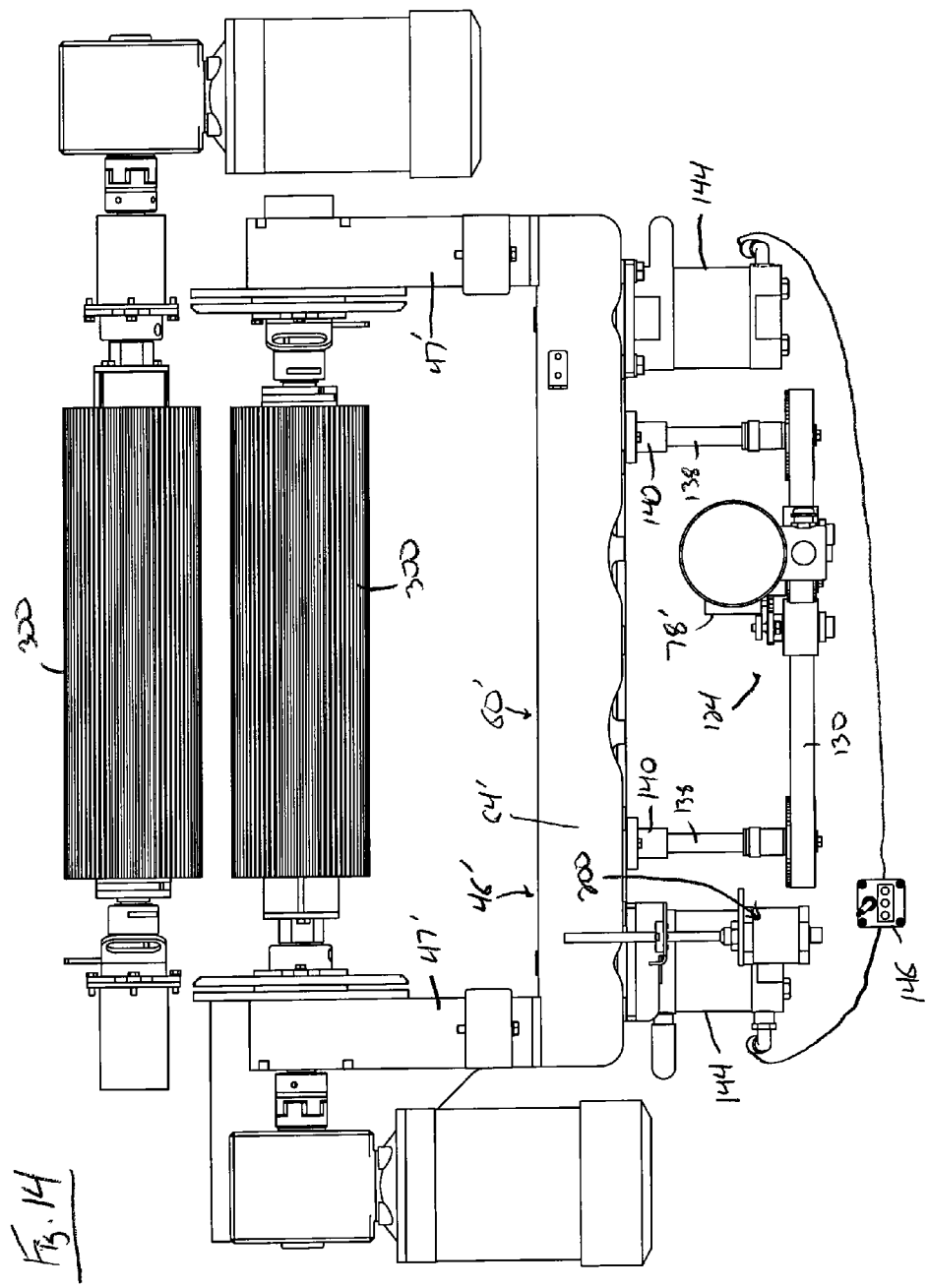
FIG. 14 is a top plan view of the internal components of the macerator of FIG. 13.

In alternative embodiments, as best shown in FIGS. 13-15, one or both of the knife rollers 50' and 52' can be replaced by a press roller 300. The press roller 300 is mounted to either the frame 46' or the support 40' in the same manner as the knife rollers 50' and/or 52' to be rotatable with respect thereto. The press roller 300 has an outer surface 302 including a number of ridges 304 thereon that are adapted to compress and tenderize food products engaged by the roller 300, in conjunction with similar treatment by an adjacent press roller 300 (FIGS. 13 and 14), or with cutting of the food product by an adjacent knife roller 52' (FIG. 15).

Also, while the macerator 14' has been shown in conjunction with an injector 12', the macerator 14' can be utilized in a stand-alone capacity, with the macerator 14' and all of its functions controlled directly by the control box 80' on the macerator 14', either by direct input from a user or via wireless or remote inputs.

Various alternatives are contemplated as being within the scope of the following claims particularly pointing out and distinctly claiming the subject matter regarded as the invention.

What is claimed is:

1. A food processing system comprising:
   a) a first food processing device adapted to receive and process a food product and including a first adjustable component therein;
   b) an adjustment motor connected to the first adjustable component; and
   c) a controller including operably connected to the adjustment motor and to an input device, the controller configured to operate the motor in response to operation of the input device to adjust the position of the first adjustable component, wherein the controller includes a storage medium in which a number of different parameters for the first adjustable component are stored, wherein each parameter is linked with a distinct input from the input device.

2. The food processing system of claim 1 wherein the first food processing device is a macerator.

3. The food processing system of claim 2 wherein the first adjustable component is a knife roller.

4. The food processing system of claim 1 further comprising a food product profile measurement device disposed on the first food processing device and operably connected to the controller.

5. The food processing system of claim 4 wherein the food product profile measurement device is selected from the group consisting of a mechanical device and an electromagnetic wave device.

6. A food processing system comprising:
   a) a first food processing device adapted to receive and process a food product and including a first adjustable component therein;
   b) a second food product processing device including a second adjustable component therein;

c) an adjustment motor connected to the first adjustable component; and d) a controller including operably connected to the adjustment motor and to an input device, the controller configured to operate the motor in response to operation of the input device to adjust the position of the first adjustable component and the second adjustable component, wherein the controller includes a storage medium in which a number of different configurations for each of the first adjustable component and the second adjustable component for processing various food products are stored, wherein each configuration is linked with a distinct input from the input device.

7. A food processing system comprising:

a) a first food processing device adapted to receive and process a food product and including a first adjustable component therein;

b) an adjustment motor connected to the first adjustable component;

c) a controller including operably connected to the adjustment motor and to an input device, the controller configured to operate the motor in response to operation of the input device to adjust the position of the first adjustable component; and d) a dynamic adjustment mechanism disposed on the first food processing device and operably connected to the controller and to the first adjustable component.

8. The food processing system of claim 7 wherein the dynamic adjustment mechanism includes at least one air cylinder with a shaft connected to the first adjustable component and a housing engaged with the shaft and connected to the first food processing device.

9. A method of processing a food product, the method comprising the steps of:

a) providing a first food processing device adapted to receive and process a food product and including a first adjustable component therein, an adjustment motor connected to the first adjustable component, and a controller including operably connected to the adjustment motor and to an input device;

b) providing an input to the input device connected to the controller; and c) opting the motor in response to the input provided to adjust the position of the first adjustable component, wherein the input device is a dynamic adjustment mechanism disposed on the first food processing device and having an air cylinder operably connected to the controller and the first adjustable component, and wherein the step of providing the input comprises the steps of:

a) measuring the movement of the first adjustable component using the air cylinder; and b) adjusting the air pressure in the air cylinder to maintain the position of the first adjustable component.

10. The method of claim 9 wherein the step of operating the motor comprises the steps of:

a) accessing a storage medium connected to the controller to locate a configuration for the first adjustable component associated with the input; and b) operating the motor to move the first adjustable component to match the configuration for the first adjustable component associated with the input in the storage medium.

11. The method of claim 9 wherein the input device is a food product profile measurement device disposed on the first food processing device and operably connected to the controller, and wherein the step of providing the input comprises the steps of:

a) measuring the profile of a food product entering the first food processing device; and b) operating the motive member to move the first adjustable component to accommodate the food product in response to the measured profile of the food product.

12. A method for adjusting the operational configuration of a macerator, the method comprising the steps of:

a) providing a macerator having a housing adapted to receive food products therein, a first roller rotatably secured to the housing, a second roller disposed adjacent the first roller and rotatably secured to a movable frame supported within the housing, an adjustment motor connected to the housing and including a movable adjustment member engaged with the frame, and a controller operably connected to the adjustment motor and to an input device, wherein the controller includes a storage medium in which a number of different parameters for the first adjustable component are stored, wherein each parameter is linked with a distinct input from the input device;

b) providing an input to the input device connected to the controller; and c) operating the motor in response to the input provided to adjust the position of the frame and the second roller with respect to the first roller.

* * * * *

UNITED STATES PATENT AND TRADEMARK OFFICE
CERTIFICATE OF CORRECTION

| | |
|---|---|
| PATENT NO. | : 8,764,523 B2 |
| APPLICATION NO. | : 12/900962 |
| DATED | : July 1, 2014 |
| INVENTOR(S) | : Ralf Ludwig et al. |

It is certified that error appears in the above-identified patent and that said Letters Patent is hereby corrected as shown below:

IN THE CLAIMS

Claim 9, column 11, line 43, delete "opting" and substitute therefore -- operating --.

Signed and Sealed this
Ninth Day of September, 2014

Michelle K. Lee
*Deputy Director of the United States Patent and Trademark Office*